(12) United States Patent
Thibadeau, Sr.

(10) Patent No.: US 11,074,356 B2
(45) Date of Patent: Jul. 27, 2021

(54) METHOD AND DEVICE FOR VEHICULAR STORAGE SECURITY

(71) Applicant: Antique Books, Inc., Pittsburgh, PA (US)

(72) Inventor: Robert H. Thibadeau, Sr., Pittsburgh, PA (US)

(73) Assignee: Antique Books, Inc., Pittsburgh, PA (US)

( * ) Notice: Subject to any disclaimer, the term of this patent is extended or adjusted under 35 U.S.C. 154(b) by 192 days.

(21) Appl. No.: 16/080,107

(22) PCT Filed: Feb. 27, 2017

(86) PCT No.: PCT/US2017/019675
§ 371 (c)(1),
(2) Date: Aug. 27, 2018

(87) PCT Pub. No.: WO2017/147581
PCT Pub. Date: Aug. 31, 2017

(65) Prior Publication Data
US 2019/0065769 A1 Feb. 28, 2019

Related U.S. Application Data

(60) Provisional application No. 62/300,577, filed on Feb. 26, 2016.

(51) Int. Cl.
*G06F 21/62* (2013.01)
*G06F 12/14* (2006.01)
(Continued)

(52) U.S. Cl.
CPC .......... *G06F 21/6218* (2013.01); *G06F 11/14* (2013.01); *G06F 11/2094* (2013.01);
(Continued)

(58) Field of Classification Search
CPC .. G06F 21/6218; G06F 11/2094; G06F 11/14; G06F 12/1408; G06F 12/1466;
(Continued)

(56) References Cited

U.S. PATENT DOCUMENTS

| | | | |
|---|---|---|---|
| 8,798,852 B1 * | 8/2014 | Chen ....................... | G06F 21/44 |
| | | | 701/29.6 |
| 9,871,787 B2 * | 1/2018 | Gale ....................... | G06F 21/78 |

(Continued)

OTHER PUBLICATIONS

Trusted Computing Group, "TCG Storage Architecture Core Speciifcation," Trusted Computing Group, Inc., Specification Version 2.01, Revision 1.00, Aug. 5, 2015, 306 pages.

(Continued)

*Primary Examiner* — Quazi Farooqui
(74) *Attorney, Agent, or Firm* — Withrow & Terranova, PLLC (57) ABSTRACT

Methods and devices for vehicular storage security are disclosed. In some embodiments, a method of operation of a storage device includes determining if there is at least one pending command. In response to determining that there is at least one pending command, the method includes configuring a next command of the at least one pending command, where configuring the next command includes determining if one or more other storage devices are a target of the next command. If one or more other storage devices are a target of the next command, the method includes determining if there are any remaining targets of the next command and delivering the pending command to a next target of the remaining targets. In this manner, complex storage systems may be kept secure.

24 Claims, 5 Drawing Sheets

(51) Int. Cl.
    *G06F 21/80* (2013.01)
    *G06F 11/20* (2006.01)
    *G06F 11/14* (2006.01)

(52) U.S. Cl.
    CPC ...... *G06F 12/1408* (2013.01); *G06F 12/1466* (2013.01); *G06F 21/80* (2013.01)

(58) Field of Classification Search
    CPC .......... G06F 21/80; G06F 3/06; G06F 3/0604; G06F 21/62; G06F 12/14
    See application file for complete search history.

(56) References Cited

U.S. PATENT DOCUMENTS

2011/0307709 A1  12/2011  Cox et al.
2015/0121134 A1   4/2015  Wipfel et al.

OTHER PUBLICATIONS

International Search Report and Written Opinion for PCT/US2017/019675, dated May 26, 2017, 15 pages.
International Preliminary Report on Patentability for International Patent Application No. PCT/US2017/019675, dated Sep. 7, 2018, 8 pages.
Examination Report for European Patent Application No. 17710648.1, dated Nov. 21, 2019, 7 pages.
Intention to Grant for European Patent Application No. 17710648.1, dated Apr. 21, 2021, 5 pages.

* cited by examiner

METHOD AND DEVICE FOR VEHICULAR STORAGE SECURITY

RELATED APPLICATIONS

This application is a 35 U.S.C. § 371 national phase filing of International Application No. PCT/US17/19675, filed Feb. 27, 2017, which claims the benefit of provisional patent application Ser. No. 62/300,577, filed Feb. 26, 2016, the disclosures of which are hereby incorporated herein by reference in their entireties.

FIELD OF THE DISCLOSURE

The present disclosure relates to storage security, and more specifically, to maintaining privacy of stored information.

BACKGROUND

With the increasing number and diversity of computational systems in vehicles of all kinds; land, sea, air, and space there is a need to provide data security and privacy for the owners and users of the vehicles. The problem is that these vehicles contain Non-Volatile Memory (NVM) that is not erased on vehicle power off or power down as with Dynamic Random-Access Memory (DRAM). Even if there is remote cloud backup of data, there are rarely practical use cases where it is not desirable to have NVM in the vehicle.

A different, but similar type of computational system is in some versions of smart houses or buildings (i.e. smart thermostats, security systems, lighting control systems, multimedia control systems, elevator control systems, door access systems, etc.), but vehicles that exist today and can be anticipated to exist in the future will almost all have these problems of security and privacy for the owner or users.

Providing security and/or privacy for these vehicles or other systems can be difficult, especially in complex storage systems where multiple NVMs may be included.

SUMMARY

Methods and devices for vehicular storage security are disclosed. In some embodiments, a method of operation of a storage device includes determining if there is at least one pending command. In response to determining that there is at least one pending command, the method includes configuring a next command of the at least one pending command, where configuring the next command includes determining if one or more other storage devices are a target of the next command. If one or more other storage devices are a target of the next command, the method includes determining if there are any remaining targets of the next command and delivering the pending command to a next target of the remaining targets. In this manner, complex storage systems may be kept secure.

In some embodiments, the method also includes, prior to determining if there are any pending commands, receiving at least one command. In some embodiments, this includes receiving the at least one command from a root node. In some embodiments, this includes receiving the at least one command from another storage device. In some embodiments, the next command is a lock command. In some embodiments, the next command is an unlock command.

In some embodiments, the unlock command includes a user ID and delivering the pending command to the next target also includes delivering the user ID to the next target.

In some embodiments, configuring the next command includes unlocking at least a portion of a data storage associated with the storage device and delivering a credential to the next target that was located on the at least a portion of the data storage that was unlocked.

In some embodiments, the storage device is a self-encrypting drive. In some embodiments, the storage device is included in a vehicle. In some embodiments, the storage device is unlocked with a vehicle key.

In some embodiments, the storage device is an entire storage drive, a partition of a storage drive, a file, a storage object, or a document.

In some embodiments, a storage device includes a data storage and circuitry. The circuitry is configured to determine if there is at least one pending command and in response, configure a next command, where configuring the next command includes determining if one or more other storage devices are a target of the next command. The circuitry is also configured to, if one or more other storage devices are a target of the next command, determine if there are any remaining targets of the next command and deliver the pending command to a next target of the remaining targets.

In some embodiments, a storage device includes a configuration module and a communication module. The configuration module is operative to determine if there is at least one pending command and, in response to determining that there is at least one pending command, configure a next command of the at least one pending command, where configuring the next command includes determining if one or more other storage devices are a target of the next command. The communication module is operative to, if one or more other storage devices are a target of the next command, determine if there are any remaining targets of the next command and, if there are any remaining targets of the next command, deliver the pending command to a next target of the remaining targets.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

With the increasing number and diversity of computational systems in vehicles of all kinds, land, sea, air, and space there is a need to provide data security and privacy for the owners and users of the vehicles. The problem is that these vehicles contain Non-Volatile Memory (NVM) that is not erased on vehicle power off or power down as with Dynamic Random-Access Memory (DRAM). Even if there is remote, cloud, backup of data, there are rarely practical use cases where it is not desirable to have NVM in the vehicle.

Providing security and/or privacy for these vehicles or other systems can be difficult, especially in complex storage systems where multiple NVMs may be included.

For simplicity and clarity in exposition, the discussion below will consider a car, but it can be seen that these same arguments can be made in regard to corporate trucks, buses, trains, boats, ships, airplanes, drones, and space ships, both manned and unmanned. These embodiments may also be applicable to some versions of smart houses or buildings (i.e. smart thermostats, security systems, lighting control systems, multimedia control systems, elevator control systems, door access systems, etc.).

Figure 1:
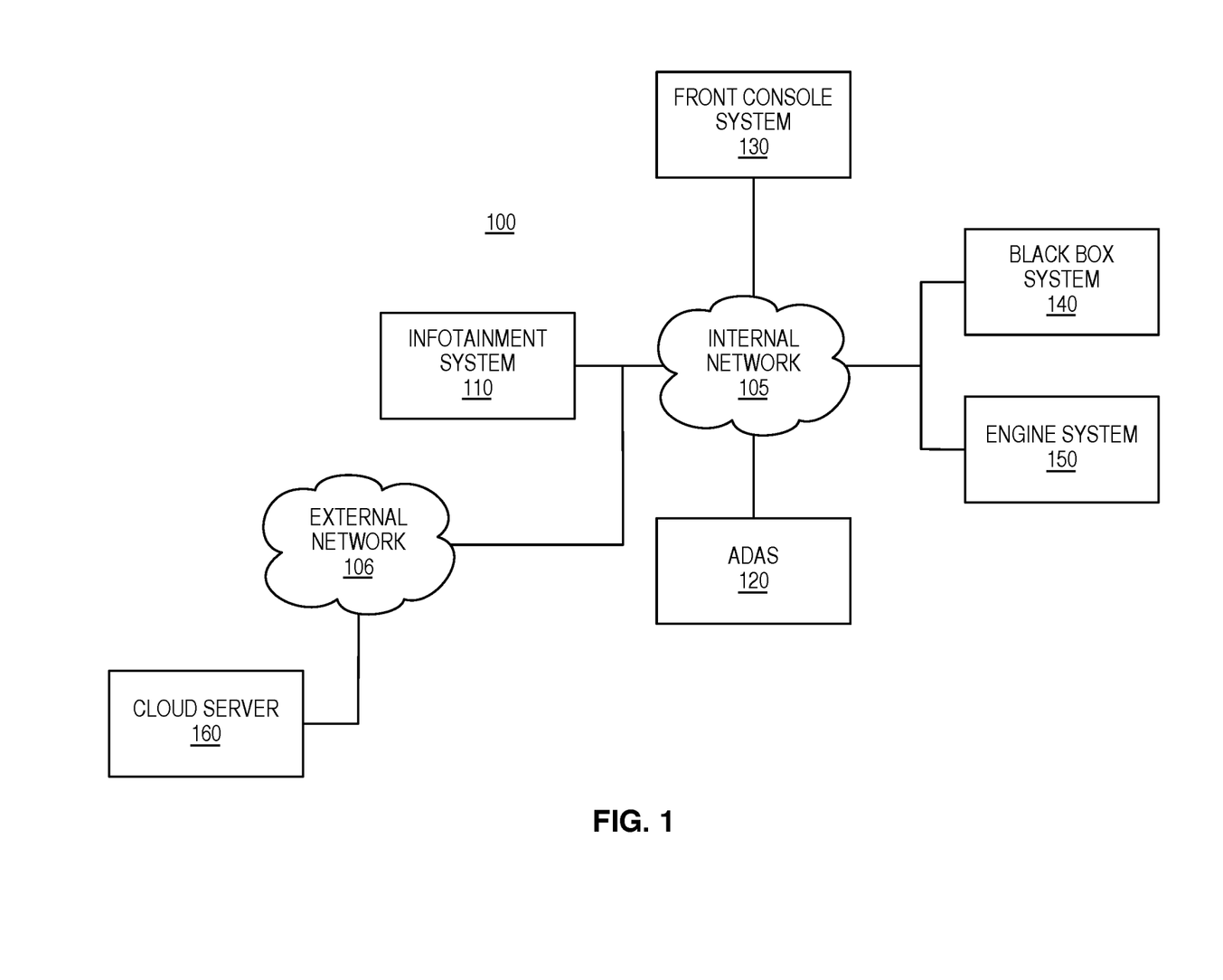
FIG. 1 illustrates an example arrangement of components in a vehicle, according to some embodiments of the current disclosure.

A vehicle can be described as a relatively autonomous computing system which involves many computers and potentially many data stores such as NVM. FIG. 1 illustrates an example arrangement of components in a vehicle 100, according to some embodiments of the current disclosure. FIG. 1 shows several systems that may contain one or more data stores. For example, Infotainment system 110, Front Console system 130, Autonomous Driver Assist System (ADAS) 120, Black Box system 140, and Engine system 150. These data stores can contain information about the users, including, but not limited to, personal data about the user, conversations that the user may have had with others in the vehicle, data about the interaction and operation of the vehicle, data about the vehicle's location when the user is in the vehicle, etc. Other computing systems inside the vehicle may not have user data, but will have data stores such as NVM for booting routine algorithms such as tire pressure monitors. According to some embodiments, methods and devices are provided to protect user specialized data.

As shown in FIG. 1, the various systems are connected using an internal network 105. Similarly, an external network 106 may be used to communicate with a cloud server 160. It should be noted that cloud server 160 may be the cloud server associated with one particular data service with the vehicle or may be multiple cloud servers each associated with a different data service. For example, in some embodiments, cloud server 160 is associated with a backup service for backing up data on the vehicle systems. In other embodiments, cloud server 160 is associated with several data services, one of which may be a music listening service used by passengers of the vehicle, a video watching service used by passengers of the vehicle and the like. Some of the potential uses of such an off-vehicle data storage location will be discussed in more detail below.

Subsystem boot data and non-user data generally needs protection against being replaced with non-authorized instances. According to some embodiments, methods and devices are concerned with protecting the privacy of the owner and users of the vehicle for user data that may be created during the use of the vehicle.

Figure 2:
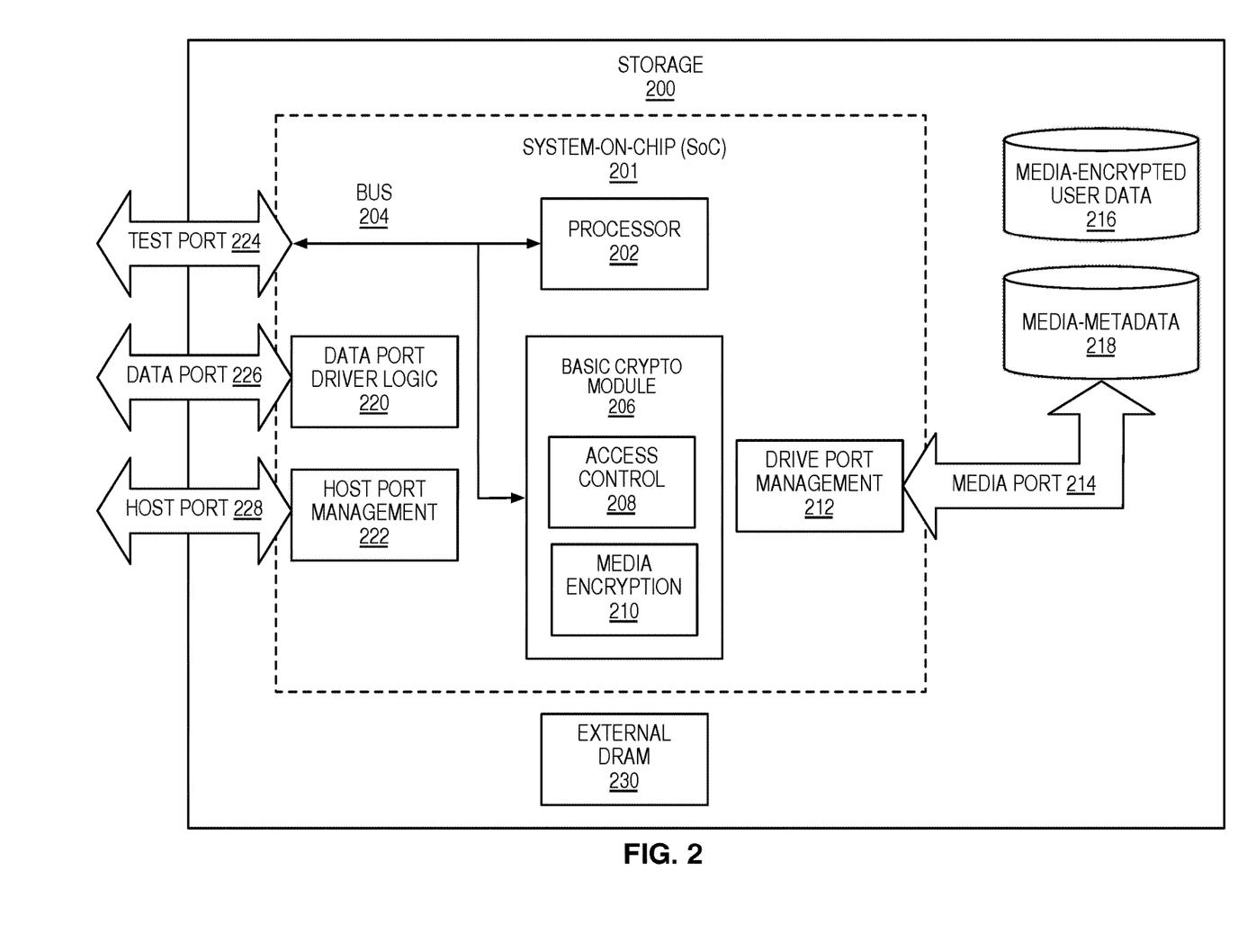
FIG. 2 illustrates an example Self-Encrypting Drive (SED), according to some embodiments of the current disclosure.

According to some embodiments, it is desirable to have the storage devices themselves protect storage under industry standard specifications so that different computer systems and different manufacturers can adopt a common framework for protecting user data, such as with a self-encrypting drive (SED) 200 shown in FIG. 2. As shown, SED 200 includes a System-on-Chip (SoC) 201 including processor 202 (such as an Advanced Reduced Instruction Set Computing Machine (ARM) processor), one or more buses 204, a basic crypto module 206, including both access control 208 and media encryption 210 functions. The SoC 201 also includes a drive port management function 212 with a media port 214 for interacting with the media.

SED 200 also includes a test port 224 (such as a Joint Test Access Group (JTAG) Port), data port driver logic 220 with a data port 226, and a host port management function 222 and a host port 228. The media includes both metadata 218 and encrypted user data 216. SED 200 also includes external DRAM 230.

In some embodiments, the SED 200 may be compliant with the Trusted Computing Group (TCG) specification, including, but not limited to the TCG Storage Workgroup Standards, namely the Core Specification, Opal Storage System Subclass (SSC) Specification, Optical SSC Specification, Enterprise SSC Specification, and Storage Interface Interactions Specification (SIIS) specification. As such, these specifications are hereby incorporated herein. The Core describes a number of Security Providers (SPs). The SSC specifications select among Core SPs for required elements and manufacturers are free to optionally include other Core SPs or SP configurations.

The minimal components will contain an Admin SP and a Cryptographic Locking SP enabled for encrypting ranges of data in the NVM. This is true of all three of the above SSC specifications now in use.

According to some embodiments, a capability is added that would represent a "Vehicular SSC" compatible with the Core Specification but with new, not previously described, features that could be described as a new SSC for the TCG Storage Workgroup Standards.

Particularly, vehicles such as vehicle 100 lend themselves to a single key since generally all the computing systems are turned on and off at the same time. The following use cases hold:

Start the car and it properly boots with authorized boot code and unlocks all user NVM for use by the one or more users of the vehicle. Some embodiments describe how the unlock credentials can be employed and distributed in the user data stores of vehicle 100 and employed as fast as needed to switch on the car. Also the credentials need to be controlled to 'turn off' a user data store, and also to cryptographically erase a user data store.

If the desire is to repurpose vehicle 100, there may be a need to alter the collection of users and their roles, with owner credentials or authenticated owner agency. It may also be desirable to crypto erase user data to potentially bring the vehicle 100 back to manufactured state for such things as resale of the vehicle.

Cars such as vehicle 100 may generally last years. Now and in the future, it will be commonplace for cars to collect personal data and information on users that can span years. This information can include where the cars have been and what users have said or done inside the cars. This information may then be associates with the identity of the users and their credit cards and health information.

User storage needs to be segregated particularly if there is more than one user. User storage may need to be segregated as well from system data and programs. For example, several members of a family may use a vehicle but user storage may be segregated so that only the members who are present in the vehicle (or presently controlling it) have their user data exposed. Similar requirements could be made for multiple drivers/operators of a fleet vehicle. Depending on the current operator, different data stores should be accessible while others should remain inaccessible. Furthermore, as vehicles become more autonomous, it is logical they will have to know who is in the car and what the roles of the people are to know who to listen to and how to understand their directives or questions.

In some embodiments, vehicles may need secure methods for storing user data in the cloud (e.g., in any suitable remote location such as an internet service, corporate network, a family computer, or perhaps a user's mobile device) in such a fashion that storage needs to be safe from theft or prying eyes. In these embodiments, User/Owner privacy is tantamount and may be additionally insured for premium payments of a vehicle which may cover the small additional cost of self-encrypting drive technology.

According to some embodiments described herein, one of the improvements over the existing TCG specifications is to provide a means of moving and storing encrypted data directly to the cloud without the possibility of theft or prying eyes by unauthorized users. Furthermore, in some embodiments, this encrypted user data needs to be able to be installed on a new replacement vehicle. For example, in a fleet, a user needs to be able to go to an assigned vehicle with the user's private user data following the user through the cloud.

Embodiments described herein may provide one or more of the following improvements:

1. Unlocking key management for a complex vehicular system.
2. User-data ranges separated potentially for every user of the vehicle.
3. Ultra-fast, effective, and industry standard cryptographic erase key management for complex vehicular systems.
4. Assurance that the system has actually performed the desired cryptographic erase and that the Media Encryption Keys (MEKs) have indeed been replaced.
5. Storage of user data off the vehicle in such a way that user data can also be installed on a different vehicle with the user/owner's authorization.

In some embodiments, one or more of these improvements are accomplished by using SED Waterfalls for Unlocking Key Management. The basic improvement is to waterfall from a SED such as SED 200 that has a credential locking range to generate credentials to unlock locking ranges on other SEDs. As used herein, the term "waterfalls" refers to the successful unlocking of one SED 200 enabling the successful unlocking of one or more additional SEDs 200.

In some embodiments, the SED itself recognizes a "Credential Waterfalling SP" that applies to a specific range containing the Credential Waterfalling SP data specific to the vehicle 100. In some embodiments, more than one SED can contain a replica of the root credential range for particular users that are authorized to start the car. Similarly, the credential range that permits a subset of users/owners to cryptographically erase all user data could be separate or part of the same credential range. Similar mechanisms can be used for users that are able to cause backup or restore operations of user data.

The waterfall has to carry the user ID and the credentials needed to unlock other ranges (e.g., user data) on the same SED or on other SEDs downstream from the root.

Figure 3:
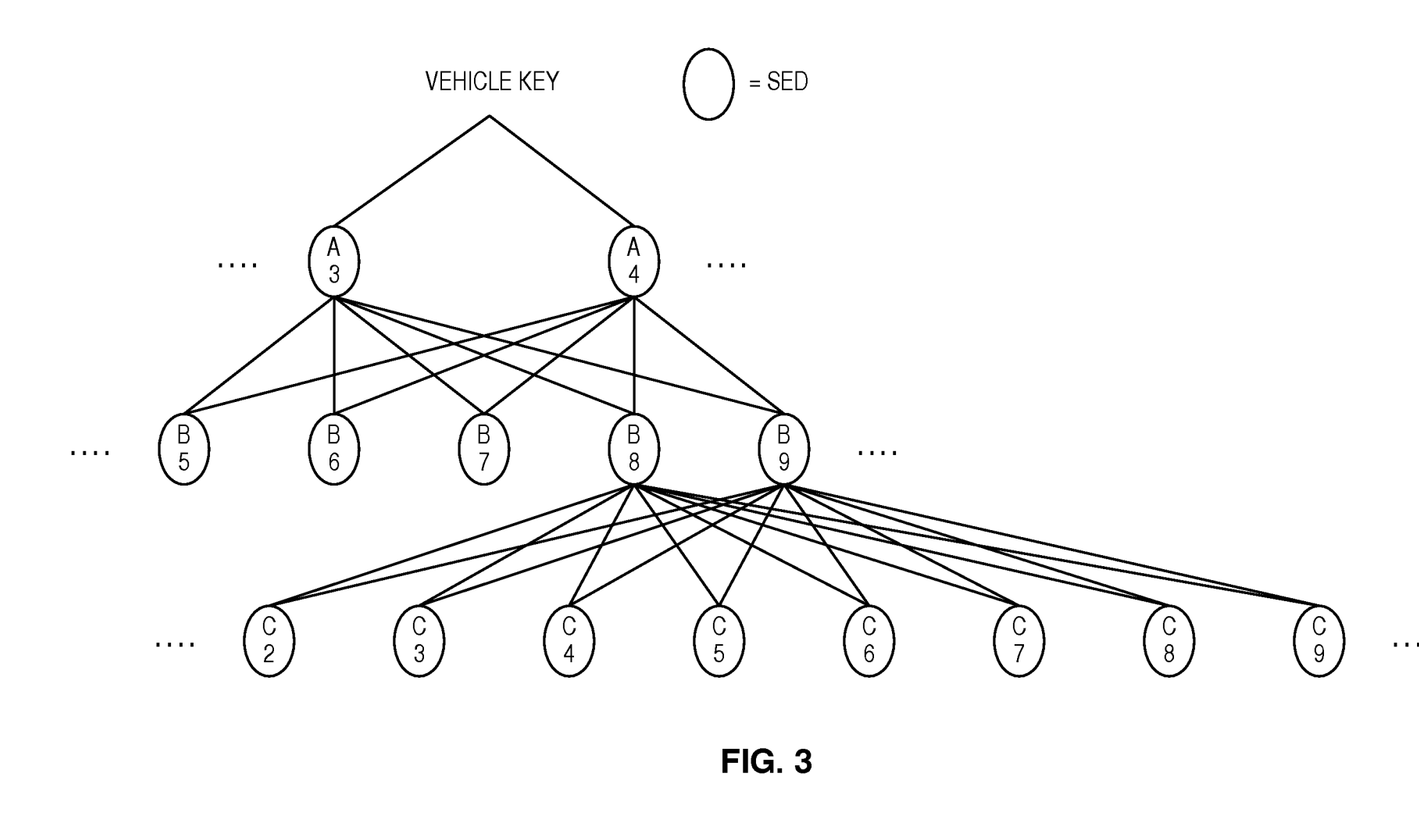
FIG. 3 illustrates an example waterfall process for sharing commands with other data stores, according to some embodiments of the current disclosure.
Figure 4:
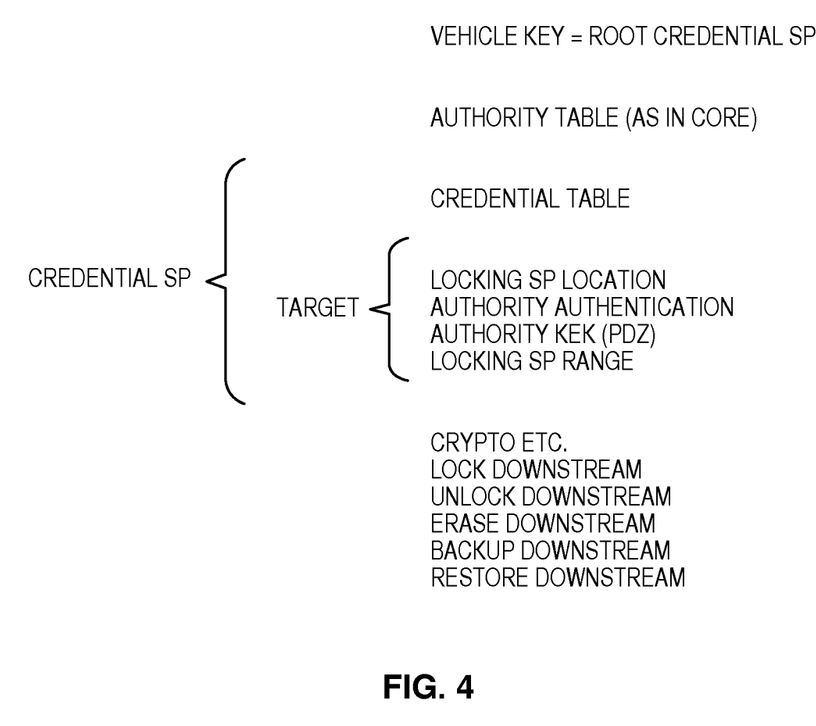
FIG. 4 illustrates an example Credential Security Provider (SP), according to some embodiments of the current disclosure.

Some embodiments of this waterfall process are illustrated in FIGS. 3 and 4. This shows the "vehicle key" as capable of instigating a waterfall process through SEDs throughout the vehicle. In this case, the vehicular key activates a process in two or more redundant root SEDs labeled as SEDs A. Any SED with the vehicular capability can be in any position in this waterfall process. The waterfall itself is determined entirely by how the SEDs are setup. This is a modular approach, meaning that if any one particular SED in the waterfall fails for any reason (such as a computer failure or a failure to unlock), the failure does not prevent the unlocking of downstream SEDs. In this respect, if one SED fails, the user is still able to start and use the car to the extent that that car component failure otherwise is not critical to otherwise starting and using the car. The privacy preservation system must not impact vehicle reliability and safety.

As shown in FIG. 3, node A3 has the ability to unlock nodes B5 through B9. This relationship can be thought of as a parent node being able to unlock a child node. However, it should also be noted that these nodes may have more than one parent. For instance, node B5 can be unlocked by either A3 or A4 in the arrangement shown in FIG. 3. In general, this process applies to any heterarchical acyclic directed graph of storage/compute nodes. Also, while FIG. 3 only shows arrangements where all parents of a child are on the same level or rank, this is not required. In a heterarchy, the nodes possess the potential to be ranked a number of different ways. In general, this means that a node may have more than one parent. For instance, node C4 could be unlocked by A3 in addition to nodes B8 and B9 in some examples.

The Core Specification provides for a number of SPs. For example, as mentioned, one Admin SP and one Locking SP are defined for all the SSCs published and approved by the TCG SWG. To handle the unique requirements of the vehicular complex system of SEDs, a new SP is defined. This is called the "Credential SP". It is defined as follows:

Like every SP, it has certain tables such as an Authority Table, a Crypto Table, etc. already defined in the Core Specification. But the Credential SP also contains a unique table called the "Credential Table". It is defined by its columns. This table has as many rows as needed for the downward waterfall (the number of SEDs below a given SED). The columns of the table constitute the control data required to be communicated under the Credential SP special actions also listed below. FIG. 4 illustrates some aspects of the Credential SP. In this example, the vehicle key is the Root Credential SP.

Credential Table columns:

Target Name: the name, or index, into the row of the Credential Table

Target Locking SP Location: which SED and which Locking SP in it is the target.

Target Authority Authentication: which Authority in the Locking SP is to be used to authenticate to that Locking SP.

Target Authority Key Encryption Key (KEK): which Authority in the in the Locking SP has the KEK to be used to provide the derivation function for the Media Encryption key.

Target Locking SP Range: which Range defined in the target Locking SP is to be manipulated.

In some embodiments, the commands unique to this Credential SP are as follows:
1. LockDownstream (Target Name): This creates a command with the row of the table to have the Targeted Locking SP lock the specified range for reading and writing.
2. UnLockDownstream (Target Name): This creates a command with the row of the table to have the Targeted Locking SP unlock the specified range for reading and writing.
3. EraseDownstream (Target Name): This creates a command with the row of the table to have the Targeted Locking SP cryptographically erase the specified range.
4. BackupDownstream (Target Name, Start/Stop): This creates a command with the row of the table to have the Targeted Locking SP return all its settings and if Start, then return the actual encrypted data on normal data reads, not the plaintext. If Stop, then on normal data reads go back to returning only plaintext. The settings of a Locking SP contain a Crypto Table that includes the actual Media Encryption Key hidden by the KEK (known by the parent SED).
5. RestoreDownStream (Target Name, LockingSP-Settings, Start/Stop) This is the inverse of BackupDownstream and restores a Locking range. Start and Stop indicate that the user data being written is encrypted (after Start) or is now just plaintext (after Stop).

Another benefit of the system is that it allows for easy changes in encryption policies. That is, if laws change and/or policies of the car manufacturer change, and certain user data that had been private is now supposed to be made public (or vice versa), the system permits the easy migration of the data using the waterfall approach with data ranges.

Figure 5:
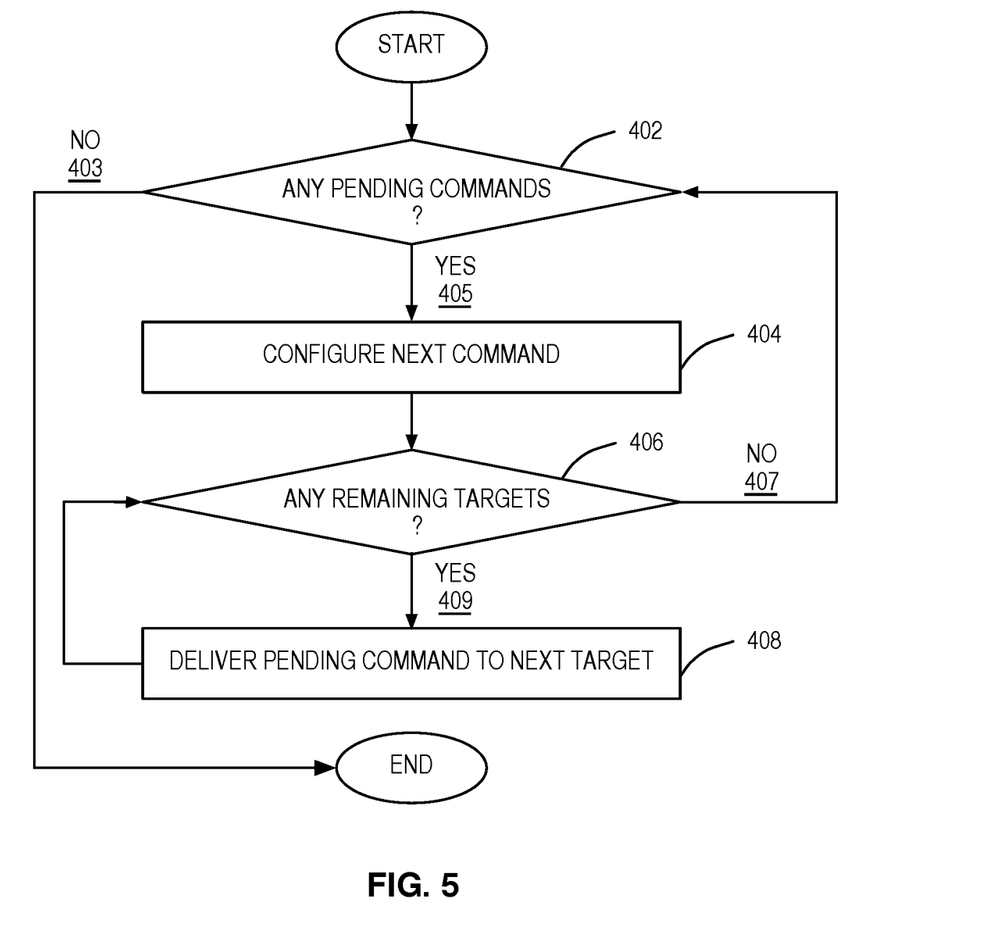
FIG. 5 illustrates an example process for distributing commands in a network of data stores, according to some embodiments of the current disclosure.

As shown in FIG. 5, any node such as SED 200 will determine if there are any pending commands (step 402). If there are no pending commands (decision 403), the process ends, or waits until there is a pending command. If there are pending commands (decision 405), the node will configure the next command (step 404). In some embodiments, this corresponds to performing the command on itself, and in some embodiments this involves determining if any other nodes should be the targets of this command. For example, if the A3 node in FIG. 3 receives an UnLockDownstream command, it may also propagate this command to nodes B5 through B9.

The node then determines if there are any remaining targets (step 406). If there are not (decision 407), then the process returns to step 402 to determine if there are any more pending commands. If there are targets remaining (decision 409), then the node delivers the pending command to the next target (step 408) and proceeds to step 406 to determine if there are any remaining targets. In this way, changes in the system can be propagated or waterfall from one root node (potentially more than one) to multiple other nodes (potentially all nodes).

It should be noted that in some embodiments, the normal read/write operations are used on the storage device. The actual encryption performed by the SED is industry standard as defined in the Locking SPs. In these embodiments, there is no re-encryption needed.

Without limitation, the KEKs need to be hidden and known only to the Locking SPs. To do this, the Authentication Authority should be a public key authority, preferably Elliptic Curve. Elliptic Curve cryptography is an approach to public-key cryptography based on the algebraic structure of elliptic curves. In some embodiments, Elliptic Curve requires smaller keys compared to cryptography systems. In installing the LockingSPs, the private keys are known by the LockingSPs. There should be one or more mechanisms in the Admin SP on the SEDs for manufacturer approved secure transmission of the root public-private key pairs needed to derive the KEKs and verify the Authentications.

As one example, it is well known that all Seagate SEDs have two certificates representing two Seagate signed certificates: one that allows the SED to uniquely sign, and the other that allows the SED to receive a key exchange, or other data, uniquely to that SED. This mechanism is what is required to maintain the confidentiality of the information in the Credential Table associated with the KEK. In some embodiments, the Credential SP will use these Admin Authorities to secure its communications and dynamically set up the pairings between the SED Locking SPs in the Waterfall.

Those skilled in the art will recognize improvements and modifications to the preferred embodiments of the present disclosure. All such improvements and modifications are considered within the scope of the concepts disclosed herein and the claims that follow.

The following acronyms are used throughout this disclosure.

ADAS Autonomous Driver Assist System
ARM Advanced Reduced Instruction Set Computing Machine
DRAM Dynamic Random-Access Memory
JTAG Joint Test Access Group
KEK Key Encryption Key
MEK Media Encryption Key
NVM Non-Volatile Memory
SED Self-Encrypting Drive
SIIS Storage Interface Interactions Specification
SoC System-on-Chip
SP Security Provider
SSC Security Subsystem Class
TCG Trusted Computing Group

What is claimed is:

1. A method of operation of a storage device, comprising:
recognizing a credential waterfalling security provider containing a credential range for at least one user stored in said storage device;
determining if there is at least one pending command in the credential waterfalling security provider;
in response to determining that there is at least one pending command for a downstream target in the credential range of the credential waterfalling security provider, configuring a next command of the at least one pending command, where configuring the next command comprises determining if one or more other downstream storage devices are a target of the next command and the next command is either a lock command or an unlock command;
if the one or more other downstream storage devices are the target of the next command, determining if there are any remaining targets of the next command; and
if any of the targets of the next command remain, delivering the at least one pending command to a next target of the remaining targets.

2. The method of claim 1 further comprising:
prior to determining if there are any pending commands, receiving at least one command.

3. The method of claim 2 wherein receiving the at least one command comprises receiving the at least one command from a root node.

4. The method of claim 2 wherein receiving the at least one command comprises receiving the at least one command from another storage device.

5. The method of claim 1 wherein the next command is the lock command.

6. The method of claim 1 wherein the next command is the unlock command.

7. The method of claim 6 wherein the unlock command comprises a user ID and delivering the at least one pending command to the next target further comprises delivering the userID to the next target.

8. The method of claim 6 wherein:
configuring the next command comprises unlocking at least a portion of a data storage associated with the storage device; and
delivering the at least one pending command to the next target further comprises delivering a credential to the next target that was located on the at least a portion of the data storage that was unlocked.

9. The method of claim 1 wherein the storage device is a self-encrypting drive.

10. The method of claim 1 wherein the storage device is comprised in a vehicle.

11. The method of claim 10 wherein the storage device is unlocked with a vehicle key.

12. The method of claim 1 wherein the storage device is one of the group consisting of an entire storage drive, a partition of a storage drive, a file, a storage object, and a document.

13. A storage device comprising:
a data storage; and
circuitry configured to:
recognize a credential waterfalling security provider containing a credential range for at least one user stored in said storage device;
determine if there is at least one pending command in the credential waterfalling security provider;
in response to determining that there is at least one pending command for a downstream target in the credential range of the credential waterfalling security provider, configure a next command of the at least one pending command, where configuring the next command comprises determining if one or more other storage devices (200) are a target of the next command and the next command is either a lock command or an unlock command;
if the one or more other storage devices (200) are the target of the next command, determine if there are any remaining targets of the next command; and
if any of the targets of the next command remain, deliver the pending command to a next target of the remaining targets.

14. The storage device of claim 13 wherein the circuitry is further configured to, prior to determining if there are any pending commands, receive at least one command.

15. The storage device of claim 14 wherein being configured to receive the at least one command comprises being configured to receive the at least one command from a root node.

16. The storage device of claim 14 wherein being configured to receive the at least one command comprises being configured to receive the at least one command from another storage device.

17. The storage device of claim 13 wherein the next command is the lock command.

18. The storage device of claim 13 wherein the next command is the unlock command.

19. The storage device of claim 18 wherein the unlock command comprises a user ID and being configured to deliver the at least one pending command to the next target further comprises being configured to deliver the userID to the next target.

20. The storage device of claim 18 wherein:
being configured to configure the next command comprises being configured to unlock at least a portion of a data storage associated with the storage device; and
being configured to deliver the at least one pending command to the next target further comprises being configured to deliver a credential to the next target that was located on the at least a portion of the data storage that was unlocked.

21. The storage device of claim 13 wherein the storage device is a self-encrypting drive.

22. The storage device of claim 13 wherein the storage device is comprised in a vehicle.

23. The storage device of claim 22 wherein the storage device is unlocked with a vehicle key.

24. The storage device of claim 13 wherein the storage device is one of the group consisting of an entire storage drive, a partition of a storage drive, a file, a storage object, and a document.

* * * * *